United States Patent [19]

Kremer et al.

[11] 3,964,951

[45] June 22, 1976

[54] METHOD OF JOINING STIFFENING MATERIAL TO SHOE UPPER USING ULTRA HIGH FREQUENCY RADIATION

[75] Inventors: Paul A. Kremer, Grosskrotzenburg; Bernhard N. Gora, Grossauheim, both of Germany

[73] Assignee: Deutsche Gold- und Silber-Scheideanstalt vormals Roessler, Germany

[22] Filed: July 2, 1974

[21] Appl. No.: 485,277

[30] Foreign Application Priority Data
July 16, 1973 Germany............................ 2336067

[52] U.S. Cl............................ 156/272; 36/45; 36/68; 36/77 R; 156/275; 156/306; 428/539
[51] Int. Cl.² ........................................ B29C 19/02
[58] Field of Search ............ 161/247, 182; 156/272, 156/275; 36/68, 45, 77 R, 77 M; 428/539, 500

[56] References Cited
UNITED STATES PATENTS

| | | | |
|---|---|---|---|
| 2,361,527 | 10/1944 | Bacon | 156/272 |
| 2,393,541 | 1/1946 | Kohler | 156/272 X |
| 2,618,796 | 11/1952 | Brophy | 36/68 |
| 3,234,668 | 2/1966 | Radcliffe | 36/77 R X |
| 3,629,050 | 12/1971 | Weinstein et al. | 161/254 |

*Primary Examiner*—William J. Van Balen
*Assistant Examiner*—Patricia C. Ives
*Attorney, Agent, or Firm*—Cushman, Darby & Cushman

[57] ABSTRACT

Formable or formed stiffening materials are prepared which are dry and free of fibrous materials and consisting essentially of a thermoplastic synthetic resin containing at least 3 parts of an active substance, preferably carbon black in 100 parts of the resin. Optionally, there are present conventional fillers, plasticizers, dyes, pigments and/or stabilizers against light, heat and/or mechanical influences.

6 Claims, No Drawings

METHOD OF JOINING STIFFENING MATERIAL TO SHOE UPPER USING ULTRA HIGH FREQUENCY RADIATION

In German Offenlegungsschrift No. P 2224967.8 and corresponding Kremer et al. U.S. application Ser. No. 362,056 filed May 21, 1973 now abandoned, there is described a stiffening material which comprises a backing of fibrous material and also containing a thermoplastic synthetic resin as a binder and at least 3 parts per 100 parts or resin of an active substance, e.g., carbon black or graphite. The stiffening materials are softenable, formable or formed in a few seconds in a microwave field.

The entire disclosure of the Kremer et al. U.S. application is incorporated by reference and is also set forth below:

The Kremer et al. application states:

The invention is directed to heat formable or formed stiffening materials which, in addition to at least one backing or layer of fibrous material, also contain at least one thermoplastic synthetic resin as binder or stiffening agent. It seves to stiffen and retain the shape of shaped articles, such as, in particular, shoes and hats, and preferably as toe or heel capping stiffening of shoes. In the shoe industry the stiffening material is often reffered to as capping material.

In the literature there are mentioned numerous types of stiffening materials which contain polymeric binding or stiffening agents. For temporarily softening these materials or to activate their adhesive film, there are used for example, organic solvents, or the softening is attained by heating.

In the pertinent technology, in order to simplify and quicken the processing, increasing preference is being given in the art in question to stiffening materials of the kind whose binders (stiffeners) are suitable to be softened by heat, the structure of the binders being so favourable, or being influenced in such a way, that, after the forming and cooling, the shaped article has attained permanent dimensional stability coupled with a high degree of flexibility. The already preformed stiffening material can be provided on either one or both sides with a layer of a thermoplastic adhesive.

The heat necessary for softening the material or to activate (tackify) the adhesive substance is supplied to the stiffening material, for example, through contact with hot forming surfaces, by steam, by other hot gases, by infrared radiation or the like.

It is further-known to use electromagnetic high frequency alternating fields in the range of the so-called microwaves to heat foodstuffs.

It is also known to use microwave absorbers in order to suppress surface wave formation and to reduce the reflection of waves from objects such as antennas and articles used in electronics or in communication transmitters in the high frequency range. As microwave absorbers there have been used, for example, iron powder, carbon powder or ferrite. For this purpose, the microwave absorbers are adhesively applied to the surfaces of these articles, for example, by means of hardening synthetic resins.

It is further known to vulcanize rubber filled with certain carbon blacks or certain silicate fillers in the microwave field. In this way rubber profiles can be produced continuously.

It should be pointed out here that there are important differences between the ultra-high frequency (UHF or microwave field) and the normal high frequency in practical use. Thus, there is no need to adapt the electrodes to the shape of the object, for example, to heat objects of materials with a relatively high or with an adequate loss index (product of the loss factor and the dielectric constant) in the UHF-field, in direct contrast to heating in the usual high frequency field (with lower frequencies). Therefore, one naturally refers to UHF- or microwave-ovens.

Application of the microwave technique known per se to the shoe and related industries was neither obvious nor was it readily possible to employ it without modification specifically to the heating of stiffening materials. In the shoe industry in addition to leather as an upper (shaft) material, synthetic resins, as for example, polyvinyl chloride containing materials, are used in an ever increasing extent. In the microwave heating of the stiffening materials, the upper materials which are adjacent or already partly connected to the stiffening materials should undergo little or no heating because of their heat sensitivity, in other words they should only be heated to an extent that damage to the upper material is excluded. Leather and especially polyvinyl choride or other known, especially polar, synthetic resins, unfortunately, become heated considerably in the microwave field despite correspondingly adapted residence time in the oven.

Surprisingly, it has now been found that the incorporation of one or more active substances into the stiffening material impregnated or coated with thermoplastic synthetic resins solves the problem. Stiffening material charged in this manner permits the heating with microwaves in a few seconds to the softening or activation temperature of the binding, adhesive or stiffening agent without the other materials connected or bonded to them being heated to any appreciable extent. By virtue of the invention, it is now advantageously possible to use theremoplastic synthetic resins having relatively high softening temperatures for the production of the new stiffening materials whereas, in the past it has not been possible to use thermoplastics of this kind on account of the heat sensitivity of the materials to be stiffened. The use of these thermoplastics with high softening temperatures also imparts considerable advantages in regard to the service properties of the stiffened materials, as for example a better resistance to heat and shape retention, for instance at high summer temperatures.

The formable or formed stiffening materials, especially shoe capping materials, according to the invention consists of at least one backing or layer of fibrous material and of at least one thermoplastic synthetic resin as binding or stiffening agent, optionally containing one or more fillers, plasticizers, dyes, pigments and/or stabilizers against light, heat and/or mechanical influences, either individually or in combination. The stiffening material is optionally provided with an adhesive coating based on a thermoplastic synthetic resin on one or both sides (surfaces). The new stiffening material is characterized in that the thermoplastic synthetic resin contains at least one active substance in an amount of at least 3 parts by weight per 100 parts by weight of active substance (or substances) containing synthetic resin. The active substance can be present in an amount of up to 40 parts (or even higher) per 100 parts of active substance containing synthetic resin. The active substance should be present in finely divided, homogeneous distribution in the stiffening material or in the thermoplastic synthetic resin of the stiffening material. The stiffening materials according to the invention are produced preferably in continuous lengths in sheetform, having a thickness from about 1 to a few millimeters; the breadth, depending on the machinery, may vary.

A further object of the invention is the use of the above described stiffening materials as show capping material or as cut pieces in a given case in premolded form, especially for stiffening the toe puff (box toe) or, preferably the counter (heel cap) of shoes.

As active substances according to the invention, the most important are carbon blacks. The active substances also include carbon black preparations and carbon black compounds as for example the gray pigments which are produced according to Beschke, British Pat. No. 1,139,620. The entire disclosure of the British patent is hereby incorporated by reference.

For example, there can be used the gray pigment made as described in Example 2 of the Beschke patent by heating 50 parts by weight of lampblack (Flammruss 101) under reflux for 15 minutes at 60°C. with 10 parts by weight of silicon tetrachloride. The excess silicon tetrachloride is then evaporated off in vacuo. The increase in weight is 2.3 parts by weight.

A suspension of 50 parts by weight of aluminum oxide in 1200 parts by weight of water is heated to 83°C. in an open agitation vessel. The pretreated carbon black is introduced into the suspension over a period of 1 hour, followed by stirring for 30 minutes at 83°C. and then by stirring with the heat off for another 3 hours. The product is then suction filtered, washed thoroughly with water and dried. 92 Parts by weight of gray pigment are obtained.

Similarly there may be used the gray pigments of Examples 1, 3 and 4 of said Beschke patent.

It could not be foreseen that stiffening materials which contain carbon black in sufficient amount, advantageously uniformly distributed in the binder, could be heated in the UHF-field in only a few seconds to the working temperature, without the materials to be stiffened being damaged by the heating. The necessary period of heating time depends f.i. on the quality and the quantity of the active substance being present in the thermoplastic(s); it depends too on the kind of the thermoplastic chosen a.s.o. Generally spoken the heating time can be from about 2 to about 100 seconds, for more practical reasons and preferably from about 5 to 20 seconds. In the context of the invention, the working temperature may be defined as that temperature at which the stiffening material is so plastic or soft that it can be easily formed, shaped or preformed. In the production of shoes the stiffening material is then designated as sufficiently softened for lasting. Carbon black in sufficient amount in this connection means an amount which effects the necessary softness in a few seconds, for example 3, 4 or 6 seconds, or produces easy formability of the stiffening material in the UHF-field. Therefore, the sufficient amount of carbon black which is herein based on the amount of synthetic resin of the binding agent or adhesive is also dependent upon the type or quality of the carbon black.

Although in principle any of the many tested types of carbon black can be used, there exists qualitative differences when it comes to the dielectrical heating the stiffening materials. Thus, in many cases lamp blacks and furnace blacks are more suitable than gas blacks. These differences relate to the manner of production of the carbon black. In other cases highly structured or as so-called conductive carbon blacks designated types of black are more suitable, which means, that they act more quickly for example in the UHF-field. Additionally, the selection of the thermoplastic synthetic resin plays a role in the dielectric heating of stiffening materials. The more polar the synthetic resin is, the higher is the attained temperature to which the stiffening the material can be heated in the same time, thus for example, the same amount and type of carbon black and amount of stiffening agent based on polyvinyl chloride in the same UHF-field heats in the same time to a higher temperature than when there is employed a stiffening material based on homopolymeric styrene.

However, it had by no means been expected that stiffening materials containing for example 25 parts by weight of furnace blacks with a BET surface area in the range of between 50 and 150 $m^2/g$ per 100 parts by weight of thermoplastic binding agent (solids contents) would permit to be heated to the working temperature in a conventional UHF-oven of 2.5 KW capacity in 3 seconds, while the material connected thereto or in contact therewith, as for example, leather, remains practically cold.

+) see J. Am. Chem. Soc. 60, 309 (1938)

A further group of active materials are the graphites.

The amount of active substance must be sufficient to produce a quick and highly uniform dielectric heating. The lower limit based on experience is about 3 parts by weight per 100 parts by weight of synthetic resin. The upper limit on the amount introduced into the stiffening materials is not critical for the action in the UHF-field. Larger amounts cause a stronger or quicker effect; lesser amounts a less intense or slower effect, depending on whether reference is made to temperature or time. The upper limits rather are determined by the difficulty encountered in the incorporation of larger amounts; with carbon blacks it depends on the type of black and, additionally by the "dilution" of the binding, adhesive or stiffening agents by large amounts of the active substance, and/or by too high or too quick heating of the stiffening material. Amounts above about 40 parts by weight per 100 parts of thermoplastic synthetic resin generally do not improve the required effect in an adequate degree but the disadvantages of higher amounts increase, as for example, the decrease of the stiffening effect, the flexibility and the binding effect of the stiffening material. According to the type (choice) of active substance the upper limmit can be raised considerably if desired, for example, to up to twice or three times the amount of thermoplastic synthetic resin. Preferably the amount of active substance is between 10 and 30 parts by weight for each 100 parts by weight of thermoplastic synthetic resin. In practice, 25 parts by weight are used with advantage, especially in cases where carbon blacks are used. The parts by weight always are based on 100 parts by weight of the thermoplastic synthetic resin which, containing the active substance(s) is used for impregnation and/or for coating the stiffening material (solids content).

The initially flat, film or sheet-like stiffening material is produced on the customary manner in continuous length. As layers or backing of fibrous material preferably there are used textile fiber structures as woven fabrics, nonwoven fabrics, knitted fabrics etc. of natural and/or synthetic fibers, including blended fabrics and including the use of blended yarns or fiber mixtures for the production of the textile structures, preferably of cotton, staple rayon, polyester, e.g., polyethylene terephthalate, polyacrylonitrile, polyamides, e.g. nylon 6, and nylon 6,6, wool, cellulose acetate or propionate, vinyl chloride/vinylidene chloride copolymer, etc. The stiffening material can also be built up from a base fabric and a cover fabric as well as from two or more textile fiber structures. As fibers there can also be used leather fibers or other fiber waste, especially in preformed heel capping (counters) for shoes.

Thermoplastic synthetic resins are preferred for impregnating or coating the textile fiber structures, for example, there can be used individually or in admixture polystyrene, styrene copolymers, e.g., styrene-butadiene or styrene-acrylonitrile copolymers, especially those with high styrene contents, e.g., at least 60%, styrene acrylate copolymers, e.g., styrene ethyl acrylate copolymer, styrene-acrylonitrile-butadiene terpolymes, polychlorobutadiene, polyvinyl esters such as polyvinyl acetate, polyacrylates, or polymethacrylates, e.g., polyethyl acrylate, poly 2-ethylhexyl acrylate, polymethyl acrylate, polybutyl methacrylate, polymethyl methacrylate, polyvinyl chloride, after-chlorinated polyvinyl chloride, polyvinylidene chloride, nitrile rubbers (butadiene-acrylonitrile copolymers), ethylene-vinyl acetate co-or terpolymers and ionomeric resins. In a given case, there can be mixed with the thermoplastic synthetic resin in the customary amounts natural resins, e.g. rosin, phenolic resins, e.g., phenolformaldehyde and phenolfurfural, maleic resins, modified colophony resins, ester gums, hydrogenated rosin, rosin modified phenol-formaldehyde or the like known resins. For ground impregnation the aforementioned synthetic resins are generally used in the form of a dispersion. In such case, if desired there can also be employed therewith the already mentioned additives, and, optionally, other conventional additives in customary amounts. If desired, conventional foam producing agents can be additionally used. Very suitable dispersions contain copolymers of styrene and butadiene, copolymers of acrylic acid ester such as butyl acrylate (or ethyl acrylate or octyl acrylate) with monomers such as vinyl chloride, vinylidene chloride, vinyl acetates, vinyl propionate, acrylonitrile, acrylamide and/or acrylic acid. The dispersions are produced in known manner.

The stiffening material can be provided on one or both sides with a so-called adhesive coat based on thermoplastic or heat activatable synthetic resins, for example, based on polychlorobutadiene, polyvinyl acetate, polyacrylic acid esters, e.g., polyethyl acrylate, ethylene-vinyl acetate copolymers or nitrile rubbers (butadiene-acrylonitrile copolymers). If desired and frequently with advantage there can be mixed with the thermoplastic of the adhesive coating other resins, for example, natural resins, phenolic resins, maleic resins, modified resins or the like resins such as those mentioned above in the customary amounts. These adhesive coatings serve to bond the stiffening material to the substrate to be stiffened. The active substances according to the invention can be worked into these adhesive coatings too or, in some cases, even alone into it. It is also possible, using suitable binders, to incorporate the active substances into intermediate layers between the adhesive coating and the actual stiffening material, additionally or possibly alone.

The fillers which can be mixed into the binders in usual amounts are the solid, powdery materials of natural or synthetic origin known in the related arts. The dyes, pigments, plasticizers and stabilizers belonging to known groups of materials which likewise can be worked in the usual amounts and by known procedures.

Unless otherwise indicated all parts and percentages are by weight.

EXAMPLES

For the impregnation of fibrous cloth there was used a carbon black synthetic resin dispersion. For this purpose there was first dispersed 20 parts by weight of carbon black in 80 parts by weight of an aqueous solution containing 3.3 weight per cent of a wetting agent which was a non-ionic fatty alcohol derivative.

These carbon black dispersions were then stirred into the thermoplastic synthetic resins of various sources, so that 25 or 12.5 parts by weight of carbon black were employed per 100 parts by weight of thermoplastic.

The impregnation of a 300 gram/m$^2$ heavy cotton fabric napped on both sides was undertaken with the described dispersion in the customary manner so that after the drying of the fabric at about 120°C. there was obtained a final weight of about 800 g/m$^2$.

In Table I there are set forth the various types of carbon black used. Each of these was employed with the synthetic resin dispersion of Example 9 (Table II). In Example 4 there was used a dispersion with 12.5 parts by weight of carbon black; in all the remaining examples there were used 25 parts by weight of carbon black with 100 parts of thermoplastic.

In Examples 9 to 12 (Table II) there were used dispersions of different synthetic resins with the same carbon black, specifically the carbon black of Example 3 in an amount of 25 parts by weight per 100 parts of synthetic resin.

The stiffening materials in Examples 1 to 12 were placed in a microwave oven with a power of 1.2 KW and a frequency of 2450 mc/s. After 3 seconds of residence time in the oven, the originally hard material was soft and optimally formable. Immetiately, after taking the material out of the UHF-oven the surface temperature of the stiffening material was measured. The starting temperature of the stiffening material was room temperature. In the last column of Tables I and II these temperatures are entered. For comparison, a stiffening material which was impregnated with the dispersion according to Example 9 except omitting the carbon black after a residence time of 10 seconds in the microwave oven showed no measurable heating and no softening.

For the use of articles according to the invention which first are produced in sheet form on conventional machines suitable pieces are cut out or punched out and sharpened (i.e, tapered to a pointed edge). These pieces are locally joined to the substrate to be stiffened, in the production of shoes for example with the upper leather, for example, by sewing, or placed in a pocket between the uppper materials. Before lasting or before preforming the above identified joined material is introduced into a microwave oven. The stiffening material cut piece is heated in the ultra high frequency field in a few seconds whereby the thermoplastic of the stiffening material is softened and/or the adhesive material found on the surface becomes tacky without the material to be stiffened undergoing any injurious heating. The cut piece can also be heated dielectrically and subsequently formed.

The UHF energy can be supplied for example from a magnetron which operates at the officially permitted frequency of 2450 megacycles.

The stiffening material of the invention preferably serves to stiffen, support and keep in shape toe and heel sections of shoes, for stiffening and keeping in shape head coverings such as hats or caps or parts thereof or bags and trunks.

The upper material of course should be substantially devoid of active substances so that it is not heated when the combination of stock or upper material and stiffening material is subjected to UHF-heating.

has a thermoplastic synthetic resin adhesive coating on one or both sides (surfaces). The new stiffening material is characterized in that it contains an active substance in an amount of at least 3 parts by weight based on each 100 parts by weight of the synthetic resin containing active substance. The active substances employed can be of any of those set forth above. The active substances should be present in the stiffening material in finely divided uniform distribution or in the thermoplastic synthetic resin of the stiffening material and/or the adhesive coating.

An object of the invention also is the use of the

TABLE I

| Ex. | Name of Black Used | Type of Black Used | Oil Absorption (FP) in % | Average Particle Size in Millimicrons | | Surface Area in m²/g | | Temperature in °C. after 3 seconds in UHF-oven |
|---|---|---|---|---|---|---|---|---|
| | | | | Arithmetical Mean [1] | Over [2] Surface | Calculated from E.M. [3] | According to BET | |
| 1 | Flammruss 101 | oxidized lamp black | 280 | 95 | 160 | 19 | 21 | 75 |
| 2 | Printex A | furnace black | 300 | 41 | 53 | 63 | 46 | 70 |
| 3 | Corax 3 HS | furnace black of high structure | 430 | 27 | 33 | 94 | 78 | 70 |
| 4 | Corax 3 HS | furnace black of high structure | 430 | 27 | 33 | 94 | 78 | 65 |
| 5 | Printex 30 | furnace black | 400 | 27 | 33 | 94 | 78 | 70 |
| 6 | Printex 300 | furnace black | 360 | 27 | 33 | 94 | 78 | 65 |
| 7 | Corax L | furnace black | 560 | 23 | 32 | 93 | 150 | 70 |
| 8 | SPF 35 | furnace black | 144+ | — | — | — | 77 | 70 |

+DBP (dibutylphthalate) absorption in ml/100 grams ASTM Iodine adsorption 80.6 mg/g.
[1] Measured and calculated from E.M. photographs
[2] Calculated from volume divided by surface of the particle (as measured from E.M. photographs).
[3] E.M. = Electron Microscope photograph

TABLE II

| Ex. | Trade Name of the Latex | Chemical Composition of the synthetic Resin in the Latex | Proportions in the Copolymer | pH Value of the Latex | Particle Size in Microns | Temperature in °C. after 3 Seconds in the UHF-Oven |
|---|---|---|---|---|---|---|
| 9 | Pliolite Latex 151 | styrene-butadiene copolymer | 85 : 15 | 10.3 | 0.1 – 0.15 | 70 |
| 10 | Syrofan 2D | polystyrene | (100) | 8–11 | 0.1 | 65 |
| 11 | Mowilith D | polyvinylacetate | (100) | 3–5 | 1–3 | 100 |
| 12 | Acronal 160 D+ | acrylic acid ester copolymer | | 5–7 | — | 105 |

+Acronal 160 D is a 40% plasticizer and solvent free aqueous dispersion of a synthetic resin based on an acrylic acid ester copolymer having a weak anionic character produced by BASF, Ludwigshafen, Germany In contradistinction to the Kremer application just described which impregnates a fibrous backing with an aqueous dispersion of thermoplastic synthetic resin to form the stiffening material, the present invention is directed to a dry, e.g., anhydrous, stiffening composition consisting essentially of thermoplastic synthetic resin and active material, e.g., carbon black or finely divided graphite.

Thus, it has now been found that stiffening materials which have no fibrous backing or support are softenable and formable in the same manner in a microwave field, e.g., of the type set forth above. The stiffening material in the form of films and sheets or in the form of cut out or stamped out adapters, which in a given case are preformed, consist of at least one thermoplastic synthetic resin, in a given case containing conventional additives such as fillers, plasticizers, dyes, pigments and/or stabilizers against light, heat and/or mechanical influences. The additives can be used individually or together. The stiffening material in a given case above-described stiffening material as a shoe capping material or as adapter, in a given case in preformed shape for stiffening especially the toe and heel parts of shoes.

As active materials the most important are carbon blacks. The active substances also include carbon black preparation and carbon black compounds as for example, the gray pigments produced according to the aforementioned Besche British Patent No. 1,139,620.

Also, in these support free stiffening materials which contain carbon black in sufficient homogeneously distributed amounts, it was observed that they can be heated to the working temperature in the UHF-field in only a few seconds without damaging the upper materials by heating. By working temperature is meant that temperature at which the stiffening material is so soft that it can be easily formed or preformed. In the production of shoes the stiffening material is then designated as optimum soft for lasting. Carbon black in sufficient amount means an amount which will produce the necessary softness or easy formability of the stiffening material in the ultra high frequency field (UHF-field) in a few seconds, for example about 2 to about 15 seconds, preferably 5 to 10 seconds. The necessary amount of carbon black to produce an optimum softening, based on the amount of synthetic resin of the stiffening material itself and/or the adhesive is also dependent upon the type of quality of the carbon black. For the choice of active materials such as carbon black or graphite and the thermoplastic synthetic resin, as well as the ratio of the amounts to each other reference is made to the working examples of the Kremer et al. U.S. application set forth above. It may be stated briefly that the amounts of active substances must be sufficient to produce a quick and as uniform as possible dielectric heating. The lower limit of active substance therefore in practice is about 5 parts by weight per 100 parts by weight of thermoplastic synthetic resin (although as indicated above as little as 3 parts of active substance can be used). Amounts over about 50 parts by weight generally do not further improve the effect sought in the mass to compensate for the disadvantages of a higher addition, as for example the decrease of the stiffening effect, the flexibility and the binding effect of the stiffening material. According to the type of active substance the upper limit can be raised if desired. Preferably the amount of active substance is between about 10 and 40 parts by weight per 100 parts by weight of synthetic resin.

The use of backing free films, sheets or shaped parts as capping materials per se is known. This type of capping material not only offers advantages in regard to the use of economically advantageous raw materials but also makes possible the production of such stiffening materials by many methods.

The above all flat film or sheet formed stiffening materials are produced by conventional methods by extrusion, blowing, calendering, casting, or molding. It is also possible to dissolve the thermoplastic synthetic resins in suitable solvents and to produce the stiffening materials from the solution, for example by casting or spreading whereupon the solvent is removed in known manner.

Suitable thermoplastic synthetic resins include for example homo- and copolymers of styrene, styrene-butadiene or styrene-acrylonitrile copolymers, especially those with high styrene contents, e.g., at least 60%, styrene acrylate copolymers, e.g., styrene-ethyl acrylate copolymer or styrene-acrylonitrilebutadiene terpolymer, polychlorobutadiene, polyvinyl esters such as polyvinyl acetate, polyacrylates or polymethacrylates, e.g., polymethyl acrylate, polyethyl acrylate, poly-2-ethylhexyl acrylate, polymethyl methacrylate, polybutyl methacrylate, polyvinyl chloride, after-chlorinated polyvinyl chloride, polyvinylidene chloride, nitrile rubber (butadiene-acrylonitrile copolymer), ethylene-vinyl acetate copolymers or terpolymers and ionomer resins as well as individually or in mixtures on occasion for example polyethylene, polypropylene and ethylene-propylene mixed polymers. In a given case there can be mixed with the thermoplastic synthetic resin in the customary amounts natural resins, e.g., rosin, phenolic resins, e.g., phenol-formaldehyde and phenol-furfuryl, maleic resins, modified rosin or the like known resins. In such case, if desired, there can be employed therewith the already mentioned additives, and, optionally, other conventional additives in customary amounts. If desired, conventional foam producing agents can also be used.

Especially well suited synthetic resins are copolymers of styrene and butadiene, polyvinyl chloride, preferably of impact resistant quality, styrene-acrylonitrile-butadiene terpolymer, ethylene-vinyl acetate copolymer and terpolymers and ionomer resins.

The stiffening material can be provided on one or both sides with a so-called adhesive coat based on thermoplastic or heat activatable synthetic resins, for example, based on polychlorobutadiene, polyvinyl acetate, polyacryllic acid esters, e.g., polyethyl acrylate, ethylene-vinyl acetate copolymers or nitrile rubber (butadiene-acrylonitrile copolymer). If desired and frequently with advantage there can be mixed with the thermoplastic synthetic resin of the adhesive coating other resins, for example, natural resins, e.g., rosin, phenolic resins, e.g., phenolformaldehyde, maleic resins, modified rosins or the like known resins in customary amounts. These adhesive coatings serve to bond the stiffening material with the substrate to be stiffened. The active substances of the invention can be worked into these adhesive coatings either alone or in both the coating and the stiffening material itself. It is also possible, using suitable binders, to incorporate the active substances into intermediate layers between the adhesive coating and the actual stiffening material.

It is also possible to introduce by means of an adhesive on the finished stiffening material immediately or later in a separate process other materials such as, for example, textiles, non-woven fabrics, staple fibers or the like. The fillers which can be mixed with the thermoplastic synthetic resins in customary amounts are the solid, powdery materials of natural or synthetic origin known in the related arts. The dyes, pigments, plasticizers and stabilizers belong to known groups of materials which likewise can be worked into the thermoplastic synthetic resins in the usual amounts and by known processes. The fiber free stiffening materials of the invention have essentially the same advantages as the stiffening materials of the aforementioned Kremer et al. U.S. application. The active material containing stiffening material is intensely softened in the UHF-field without the materials to be stiffened, as for example stock material leather or plasticized PVC being injured by heat. The UHF heating for example usually heats the stiffening material to 60° to 140°C. but this can be varied.

EXAMPLE 13

Stiffening Materials 1 to 3

On a set of mixing rolls having a roll temperature of 130° to 140°C. there were worked into a copolymer of ethylene and vinyl acetate until homogeneity was obtained 15 weight percent (stiffening material number 2) respectively 30 weight percent (stiffening material number 3) of a furnace black (Corax L). The copolymer had a melt index of 3.4 to 4.6 g/10 min. (DIN53735E; DIN signifies German Industrial Standards), a melting range of 91° to 96°C. (polarization microscope) and a density of 0.934 to 0.936 g/cm$^3$. After homogeneous distribution of the carbon black, the sheet was drawn off from the set of rolls and then molded in a press at 150°C. under a pressure of 75 kp/cm$^2$ to a film of the following thickness, stiffening material (2) 0.8 to 0.85 mm and stiffening material (3) of 0.09 to 1.0.

Stiffening material (1) is for comparison and has been produced out of the same materials and with the same methods as above-described, however, without the use of carbon black. The thickness of the film was 0.80 to 0.85 mm.

EXAMPLE 14

On a set of mixing rolls having a roll temperature of about 110°C. there were homogeneously introduced 15 weight percent of a furnace black (Corax 300 of Degussa) into a mixture of two polyamides, polyamide I and polyamide II, produced from fatty acids and polyamides in the ratio of 26 parts by weight polyamide I to 74 parts by weight polyamide II. Polyamide I has a softening point of 105° to 115°C. (according to DIN 1995 3.04/04) and a viscosity of 21 to 27 poise at 160°C. (Brookfield Rotation Viscosimeter).

Polyamide II had a softening point of 117° to 121°C. (according to AFNOR 6608 T or DIN 19995) and a viscosity of 60 poise at 191°C. (Brookfield Rotation Viscosimeter). After homogeneous distribution of the carbon black the sheet was drawn off of the set of rolls and then pressed in a press at 100°C. and a pressure of 75 kg/cm² (75 kilogram force/cm²) to form a film having a thickness of 0.75 to 0.80 mm (stiffening material 5). Comparison stiffening material (4) was made with same materials and by the same method as just described but omitting the carbon black. The thickness of the film was 1.3 to 1.4 mm.

The stiffening materials made in examples 13 and 14 were placed in a microwave oven having a microwave power of 1.3 kw and a frequency of 2450° mega Hertz. After the residence times in the furnace set forth in Table III below, the original stiff materials are soft and optimally formable. Immediately after taking them out of the UHF oven the surface temperature of the stiffening materials was measured. The temperature before placing in the oven was the same for all samples, namely room temperature. The residence times and surface temperatures are given in Table III.

TABLE III

| Example | Stiffening Material No. | Carbon Black in Weight % | Residence Time In Seconds | Surface Temperature in °C |
|---|---|---|---|---|
| 13 | 1 (comparison) | — | 15 | no heating |
|  | 2 (invention) | 15 | 3 | 60 |
|  | 2 (invention) | 15 | 6 | 80 |
|  | 3 (invention) | 30 | 3 | 130–140 |
| 14 | 4 (comparison) | — | 15 | no heating |
|  | 5 (invention) | 15 | 6 | 60 |
|  | 5 (invention) | 15 | 10 | 70 |

What is claimed is:

1. A method of joining a stiffening material consisting essentially of a thermoplastic synthetic resin stiffening agent containing homogeneously dispersed therein 3 to 50 parts per 100 parts of the synthetic resin of carbon black or graphite as an active substance to a shoe upper material of leather or synthetic resin which is devoid of such active substance without significantly heating the shoe upper material comprising heating the stiffening material to the temperature at which it becomes soft and adhesive by subjecting the stiffening material and adjacent shoe upper material to ultra high frequency radiation for about 2 to 15 seconds.

2. A method according to claim 1, wherein the carbon black is present in an amount of 10 to 40 parts per 100 parts of synthetic resin.

3. A method according to claim 1 wherein the ultra high frequency radiation is 2450 mega Hertz.

4. A method according to claim 1 wherein the active material is carbon black.

5. A method according to claim 4, wherein the heating attained is from 60° to 140°C.

6. A method according to claim 5, wherein the heating is for up to 10 seconds.

* * * * *